United States Patent [19]
Goetzmann

[11] 3,928,129
[45] Dec. 23, 1975

[54] NUCLEAR REACTOR ELEMENT

[75] Inventor: Claus Goetzmann, Erlangen, Germany

[73] Assignee: Siemens Aktiengesellschaft, Munich, Germany

[22] Filed: Aug. 10, 1973

[21] Appl. No.: 387,249

[30] Foreign Application Priority Data
Aug. 31, 1972 Germany............................ 2242933

[52] U.S. Cl. ........................ 176/38; 176/59; 176/61
[51] Int. Cl. .............................................. G21c 9/00
[58] Field of Search ............. 176/48, 38, 51, 61, 87

[56] References Cited
UNITED STATES PATENTS
3,172,819  3/1965  Picton................................ 176/43
3,305,452  2/1967  Remoleur.......................... 176/38 X

*Primary Examiner*—Robert F. Stahl
*Attorney, Agent, or Firm*—Kenyon & Kenyon Reilly Carr & Chapin

[57] ABSTRACT

A nuclear reactor element includes a vertically operating, elongated tubular gas-coolant duct in which a bundle of reactor rods having metal casings is positioned, the duct having an adjustable flow choke in its upper end portion above the bundle of rods and the duct having a lower portion extending below the bundle. A plurality of such elements are operated in parallel in a gas-coolant breeder reactor with the flow chokes of each individually adjusted to obtain a uniform coolant temperature discharging through their lower portions. For emergency use the element has a static non-adjustable flow choke positioned in its lower portion by material which deforms and permits this static choke to fall, if heated by coolant heated by the reactor rod casings operating at excessively high temperatures. This static flow choke is designed so that the adjustable flow choke may be adjusted to provide a coolant flow for normal operation but which would provide for a somewhat larger flow passage in the absence of the choke. Therefore, if due to abnormal operation the static choke falls, a larger coolant flow passage is immediately established without requiring adjustment of the adjustable flow choke.

3 Claims, 3 Drawing Figures

NUCLEAR REACTOR ELEMENT

BACKGROUND OF THE INVENTION

A gas-coolant breeder reactor has a reactor core comprising breeder and fuel elements down through which parallel flows of the gas-coolant pass. To obtain a uniform coolant temperature throughout the core, the individual elements, which comprise a bundle of reactor rods encased by a vertical gas-coolant duct, are provided above the rods with adjustable flow chokes which by appropriate adjustment provide for an overall uniform gas-coolant temperature on the part of the coolant's discharge downwardly through the various elements. Because the choke of each element requires individual adjustment, the choke is somewhat complicated and expensive, and it must be provided with a control rod for adjustment from outside of the reactor biological shield. There is no easy way to adjust the adjustable choke of each element individually in a rapid manner.

However, a rapid increase in the flow area through such an element is indicated if, for example, the coolant flow through the element suddenly decreases from its normal pressure due to, for example, a leak in the coolant flow piping, or failure on the part of the blower or blowers to apply full flow force to the coolant. The fuel elements are metal cased and their casings have a maximum safe operating temperature which may be exceeded if the coolant flow fails to maintain its designed rate for which the adjustable choke of the fuel element has been adjusted for normal operation. In the event of such trouble it is a practical impossibility to provide for rapid opening of the flow choke of the element unless possibly by an expensive and complicated system.

SUMMARY OF THE INVENTION

With the above in mind, the object of the present invention is to provide an element of the type described and provided with a simple, inexpensive and reliable means for suddenly increasing its capacity to pass a coolant flow, and which operates automatically in response to the fuel element casings approaching unsafe operating conditions. It is to be understood that although the coolant flow pressure may drop unexpectedly, the coolant will continue to flow through the elements at a reduced pressure; and if the capacity of the elements to pass the coolant flow is increased, the volume of coolant, even with the reduced pressure, which passes through the element is adequate to prevent destruction of the fuel element casings for the time required for correction of the abnormal condition.

According to the present invention, this object is attained by providing the element with a static, non-adjustable flow choke positioned in the lower portion of the element's gas-coolant duct below the reactor rods, and which is positioned or held by material which deforms and permits the static choke to fall free from the duct's bottom end portion, if heated by coolant heated by the reactor rod casings approaching unsafe operating temperatures.

Preferably the static choke is entirely made of such material, and the material is preferably a metal which deforms by melting, such as brass having a melting temperature of approximately 900°C.

The static choke may be in the form of a depending frusto-conical shape with an upper peripheral portion fixed to the inside of the element's gas duct adjacently below its bundle of reactor rods. The static choke may be made of relatively thin gauge sheet metal.

The usual adjustable choke of the element is capable of being opened to provide a higher flow rate downwardly through the duct than is ordinarily required during normal operation. The flow capacity of the static choke should be designed so that it always passes a coolant flow adequate for normal operating conditions but which chokes the flow so that with normal flow pressure the adjustable choke must be opened somewhat more than it normally would be to provide a flow rate required for normal operation of the reactor rods. With the groups of elements, individual adjustment is required, but in all cases the adjustable chokes should be opened somewhat wider than would normally be required, because of the choke effects of the static chokes.

In case the coolant flow pressure suddenly decreases, the reactor rods begin to overheat so that their metal casings, which are normally made of suitable stainless steel, approach unsafe operating conditions. This heats the coolant discharging temperatures above normal, and one or more of the static chokes, as required, deforms or melts and falls to immediately provide the element's duct or ducts with an increased flow rate capacity, the adjustable flow rate valves already being opened somewhat more than usual. The increased flow of coolant which then results, which then may approach the former normal flow, keeps the reactor rods from reaching unsafe temperatures.

BRIEF DESCRIPTION OF THE DRAWINGS

An example of a gas-coolant breeder reactor breeder rod element embodying the present invention is illustrated by the accompanying drawings in which.

DETAILED DESCRIPTION OF THE INVENTION

Figure 1:
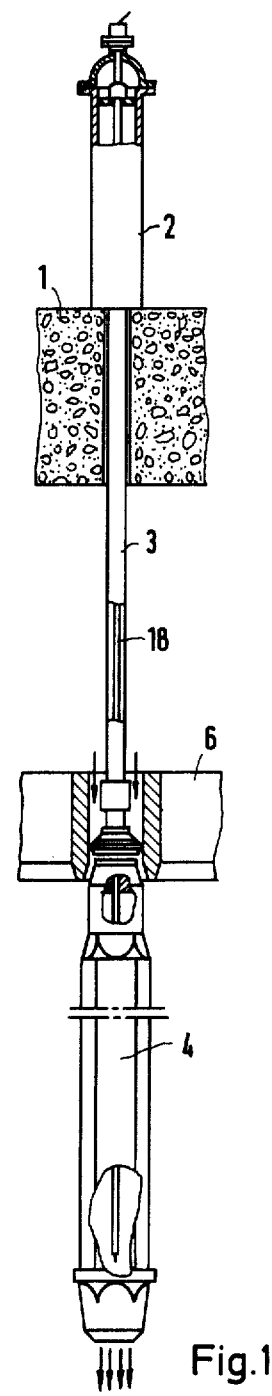
FIG. 1 shows the element as it is suspended when in operation, and shows the control system for its adjustable flow choke.
Figures 2A, 2B:
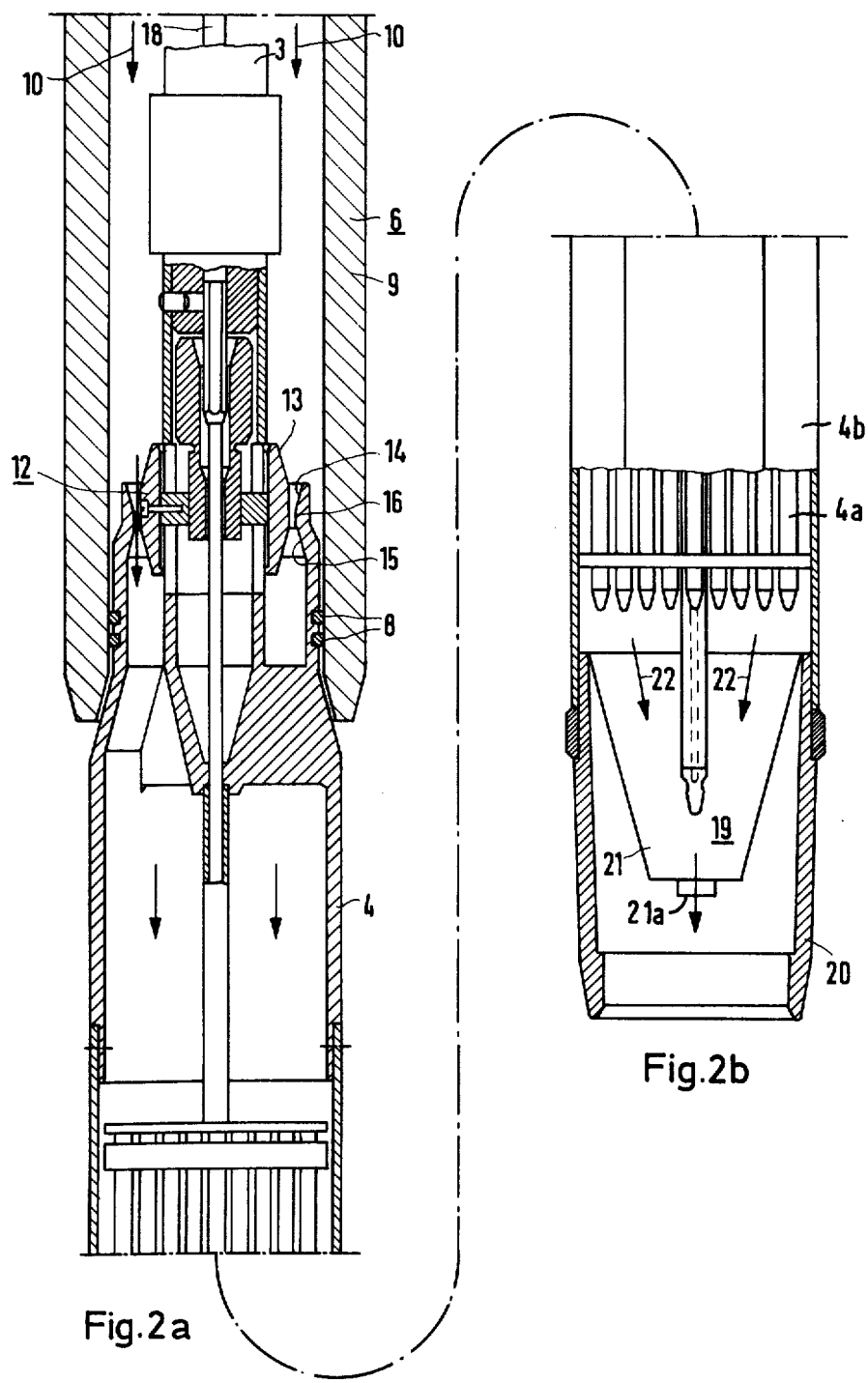
FIG. 2a in vertical section shows the upper portion of the fuel element to illustrate generally its adjustable flow choke.
FIG. 2b shows the bottom or lower end portion of the element, partially in vertical section, and illustrates an example of the static flow choke of the present invention.

Referring first to FIG. 1, to simplify the illustration, only a portion of the concrete reactor pressure vessel 1, of the gas-coolant breeder reactor, is illustrated, a mounting arrangement 2 via a tubular suspension rod 3, supporting a breeder element 4 with its upper end guided and spaced from the other elements, by way of a grid plate 6. It is to be understood that there will be a number of the elements 4 and their associated parts with the grid plate 6 interspacing the elements.

The element is partially inserted and sealed by means of sealing rings 8 in the interior of the part 9 of the grid plate. The gas-coolant, such as $CO_2$ or helium, is supplied, normally as a fixed flow at a proper pressure, downwardly as indicated by the arrows 10. The adjustable choke is generally indicated at 12 as having a movable body 13, its point of maxiuum constriction being formed between oppositely flared portions 14 and 15, as shown at 16, the movable body 13 being moved up and down to vary the cross-sectional area at the constriction 16. The movable choke element 13 may be moved up and down by a drive mechanism via an actuating rod 18 which extends into the tubular suspension rod 3 to the drive mechanism, such as a fluid operated piston, in the mounting arrangement 2.

The above details are conventional and are, therefore, not described in detail other than to provide the understanding that the adjustable choke 12 is of a relatively complicated construction, which is therefore expensive, and that to provide a similar type of mechanism for use in emergencies would be, therefore, expensive and complicated. In addition, a sensing mechanism and control equipment would be required for the actuation of such an adjustable choke.

Contrastingly, according to the present invention, the element 4 which as can be seen contains the bundle of reactor rods 4a encased by the elongated tubular gas duct 4b, has in the lower end 20 of the latter the static flow choke indicated at 19. This lower end 20 extends below the bundle 4a in the case of the conventional element. Within this end the downwardly depending frusto-conical, sheet metal static flow choke 21 is positioned by having its periphery attached to the inside of the duct's end 20. The flow choke may be kept entirely within this end 20. The lower end of this choke has a bottom in which an orifice 21a is centrally located. The sheet metal used should have a melting temperature which assures destruction and falling of the choke when heated by the gas-coolant receiving heat from overheating of the reactor rods 4a having the casing which must be protected against excessive operating temperatures.

As previously indicated, the orifice 21a should pass the gas-coolant when under its normal operating pressure at a rate providing proper cooling of the rods 4a, providing the adjustable choke 12 is opened a little more than would otherwise be required.

Under such conditions, if the flow pressure of the coolant suddenly reduces due to trouble or accident, the gas-coolant flowing downwardly through the elongated tubular duct of the casing, becomes heated by the overheating rods 4a to temperatures above the deforming or melting temperature of the static choke 19. The latter being made of relatively thin-gauge sheet metal, rapidly reaches a temperature above its melting temperature, it then deforming or melting and falling from the lower end of the element, thus increasing immediately the flow area capacity of the element so that although the flow pressure has reduced, an adequate flow of the coolant is maintained through the element to preserve the integrity of the fuel element's casings until the operating conditions can be returned to normal.

As previously indicated, the reactor core includes a number of such elements. Each may be provided with the static choke and each choke may have the same flow rate capacity as the others. Then by adjustment of the adjustable choke, opening them a little more than would otherwise be required, the flow rates through the various elements can be adjusted to maintain a uniform coolant flow correctively from all of the elements. If the rods of only one begin to overheat, the static flow choke of the present invention quickly deforms or melts, falls, and preserves the integrity of the rod casings of that element.

What is claimed is:

1. A gas-cooled nuclear reactor fuel element comprising a bundle of nuclear fuel rods having metal casings having maximum safe operating temperatures, an elongated tubular gas-coolant duct radially enclosing said bundle, said duct having an inlet end for gas coolant, an adjustable gas-coolant flow choke for said inlet end, said duct having an outlet end for gas coolant heated by said fuel rods when said element is operating, and a non-adjustable static gas-coolant flow choke for said outlet end and connected to said outlet end by metal having a melting temperature substantially lower than said maximum safe operating temperature of said metal casings of said fuel rods.

2. The fuel element of claim 1 in which said adjustable gas-coolant flow choke has a maximum gas-coolant flow rate capacity and said static gas-coolant flow choke has a gas-coolant flow rate capacity less than said maximum gas-coolant flow rate capacity of said adjustable gas-coolant flow choke.

3. The fuel element of claim 2 in which said gas-coolant duct has an inside adjacently below said bundle of nuclear fuel rods and said static choke is a sheet-metal frusto-conical shape made substantially entirely of said metal having a melting temperature substantially lower than said maximum safe operating temperature of said metal casings of said fuel rods, said frusto-conical shape having a large end with a periphery and a smaller end, said periphery being connected to said inside of said gas-coolant duct adjacently below said bundle of nuclear fuel rods and said smaller end facing away from said bundle of nuclear fuel rods and forming a gas-coolant outlet orifice.

* * * * *